(No Model.)
R. S. CRAWFORD.
AXLE BOX FOR METAL WHEELS.
No. 538,011.                    Patented Apr. 23, 1895.
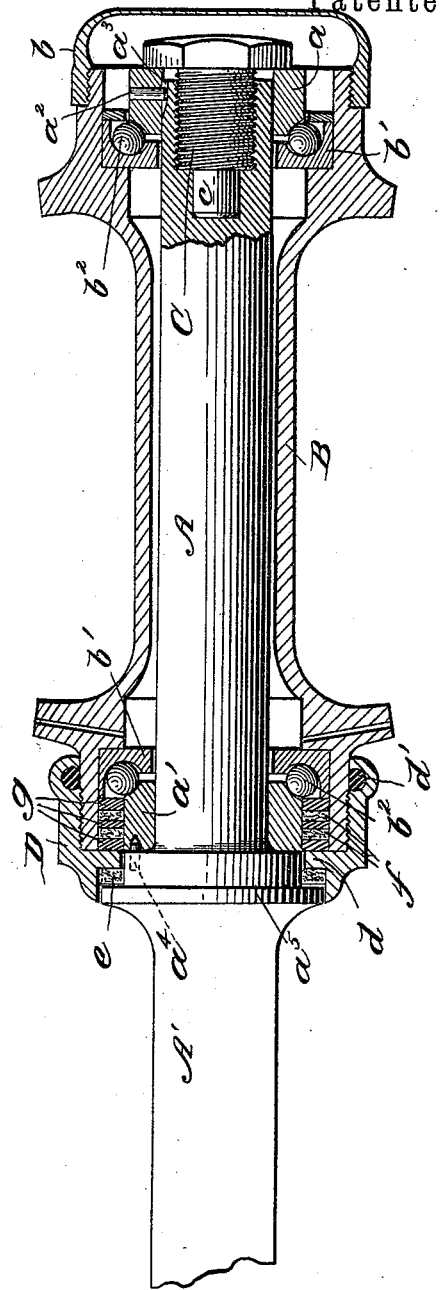
Witnesses
Inventor:

UNITED STATES PATENT OFFICE.

ROBERT S. CRAWFORD, OF HAGERSTOWN, MARYLAND.

AXLE-BOX FOR METAL WHEELS.

SPECIFICATION forming part of Letters Patent No. 538,011, dated April 23, 1895.

Application filed February 13, 1895. Serial No. 538,261. (No model.)

*To all whom it may concern:*

Be it known that I, ROBERT S. CRAWFORD, a citizen of the United States, residing at Hagerstown, in the county of Washington and State of Maryland, have invented certain new and useful Improvements in Axle-Boxes for Metal Wheels, of which the following is a specification, reference being had therein to the accompanying drawing.

My invention has for its object to provide a ball-bearing axle-box for carriage wheels (and more particularly for that class of carriage wheels the hubs of which are of metal) which will be dust-proof and water-proof, so that even when a carriage having wheels provided with my axle boxes is being washed water cannot by any possibility be forced into the ball-bearings, even when under great pressure.

In the accompanying drawing, which is a longitudinal sectional view of my improved axle-box, A denotes the axle-spindle and A' a portion of the axle.

B is the metallic hub of the wheel made in the form of a sleeve loosely surrounding the axle-spindle A, said hub being tightly closed at its outer end by a screw cap $b$. Within the hub or sleeve B are tightly fitted the rings $b'$ between which and the cones $a$ and $a'$, closely fitted on the axle spindle, are the balls $b^2$ forming the ball-bearings. The outer cone, $a$, is held stationary with the axle spindle by means of a pin $a^2$ which enters a small groove $a^3$ formed in the axle spindle so that said cone may be slightly adjusted longitudinally of the axle spindle, to take up wear.

C is a cap-screw tapped in the end of the axle-spindle, and having a reduced inner end or nib $c$ entering a suitable recess at the inner end of the hole into which said screw is tapped, the head of said screw being of proper diameter to hold the cone $a$ in place on the axle-spindle. When it is desired to take up wear the screw C may be removed and the end of its nib filed off slightly, in order that the said screw may be turned a little farther in; or the hole may be deepened slightly for this purpose.

The cone $a'$ at the inner end of the axle spindle is held stationary by a pin $a^4$. The axle A' is provided with a flange $a^5$, and, surrounding the inner end of the hub B and having a screw engagement therewith, is a nut D having an inwardly projecting flange $d$ between which and the flange $a^5$ on the axle is interposed a ring or washer $e$ of leather or other packing or elastic material. The outer end of the nut D has an annular recess which receives a rubber ring $d'$ which tightly embraces that part of the hub B which it surrounds, and which therefore prevents the entrance at any time of any water to the screw threads joining the said nut with the said hub. Between the ring $b'$ at the inner end of the hub B and the flange $d$ of the nut D are interposed washers $f$ of felt or other soft elastic material, and between and outside the said felt washers are rings or washers $g$ of steel or other suitable metal, these metal washers or rings holding the felt washers in shape and retaining them properly in place, while the felt washers serve to exclude dust or water from the ball bearings at the inner end of the hub, under ordinary conditions.

When the carriage wheel is running the nut D will be adjusted to the position shown in the drawing, but when the carriage is to be washed and it is desirable to make the ball-bearings absolutely water-proof, so that water under pressure cannot by any possibility be forced into the bearing at the inner end of the hub, the nut D is slackened or turned toward the flange $a^5$ on the axle, thus tightly compressing the leather ring or washer between the said flange and the flange $d$ of the said nut, and thereby making an absolutely water-proof joint at this point. The outer end of the hub, being closed by the screw cap $b$, is at all times absolutely dust and water-proof.

I do not broadly claim in this application a ball-bearing axle-box having its outer end tightly inclosed so as to be at all times dust and water-proof, and a movable device at the inner end of said axle box which is normally carried in an idle position but which is adapted to be shifted into an operative position to form an absolutely water-proof joint at the inner end of the axle-box when the carriage wheel is to be washed, as this feature is claimed in another application, Serial No. 538,271, filed simultaneously herewith.

Having thus described my invention, I claim and desire to secure by Letters Patent—

1. The combination with an axle, of an axle box provided with ball-bearings at or near its opposite ends, and having its inner end screw threaded externally, and a nut fitting the said screw-threaded inner end of the said axle-box and provided interiorly toward its outer end with an elastic ring which tightly hugs the sleeve or part on which the said nut is mounted so as to exclude water from the threads of said nut and sleeve.

2. The combination with an axle having a flange, of an axle-box provided with ball-bearings at or near its opposite ends, and having its inner end screw threaded exteriorly, and a nut fitting the said screw threaded inner end of the said axle-box and provided interiorly toward its outer end with an elastic ring which tightly hugs the sleeve or part on which the said nut is mounted, said nut being provided with an inwardly projecting flange between which and said flange on the axle is interposed a washer of leather or other suitable packing material, so that when the said nut is turned back to compress said packing material there will be an absolutely water tight joint at the inner end of the axle-joint.

3. The combination with the axle A' having the flange $a^5$ and the spindle A, of the hub or sleeve B loosely surrounding the said spindle, ball-bearings interposed between the said hub or sleeve and the said spindle, the nut D carried at the inner end of the said hub or sleeve and having an inwardly projecting flange $d$, felt and metal washers interposed between the ball bearing at the inner end of said hub and the said flange $d$, and the packing ring interposed between said flanges $d$ and $a^5$.

4. The combination with the axle A' and its spindle A, of the hub or sleeve B loosely surrounding the said spindle, ball-bearings interposed between the said hub or sleeve and the said spindle, the nut D carried at the inner end of the said hub or sleeve and having an inwardly projecting flange $d$, said nut being recessed interiorly, an elastic ring in the recess of said nut to tightly embrace said hub or sleeve, and felt and metal washers interposed between the ball bearing at the inner end of said hub and the said flange $d$.

In testimony whereof I affix my signature in presence of two witnesses.

ROBERT S. CRAWFORD.

Witnesses:
HENRY CALVER,
ROBINSON WHITE.